3,592,876
THERMOPLASTIC POLYESTER MOULDING COMPOSITIONS

Ludwig Brinkmann and Walter Herwig, Frankfurt am Main, and Klaus-Dieter Asmus, Hofheim, Taunus, Germany, assignors to Farbwerke Hoechst Aktiengesellschaft vormals Meister Lucius & Bruning, Frankfurt am Main, Germany
No Drawing. Filed Mar. 3, 1969, Ser. No. 803,991
Claims priority, application Germany, Mar. 23, 1968,
P 17 69 035.6
Int. Cl. C08g 17/06
U.S. Cl. 260—873
9 Claims

ABSTRACT OF THE DISCLOSURE

Method for making shaped articles by injection moulding polyester compositions comprising aromatic dicarboxylic acids, saturated aliphatic or cycloaliphatic diols and alcohols having more than two primary hydroxyl groups. The shaped articles do not show flash formation.

---

The present invention relates to thermoplastic polyester moulding compositions which do not show flash formation when injection moulded under conventional conditions.

It has been proposed to process linear, saturated polyesters of aromatic dicarboxylic acids by injection moulding. Injection moulding of polyethylene terephthalate has gained industrial importance. Injection moulded articles made of polyethylene terephthalate have, however, the drawback that after removal from the mould their dimensional stability is not maintained owing to after-crystallization, especially at high temperatures. It has repeatedly been proposed, therefore, to process polyethylene terephthalate with additions of inorganic or organic substances promoting crystallization.

In British Pat. No. 1,104,089 it has been described, for example, that inorganic substances that are insoluble in the polyester melt, such as calcium carbonate, calcium sulfate or titanium dioxide and have a particle size of less than 2 microns accelerate the crystallization of the polyester composition. The inorganic substances are added to the polyesters in an amount of from 0.05 to 0.5% by weight. The addition ensures that at a sufficiently high temperature of the mould the polycondensation product reaches an optimum degree of crystallization during moulding so that alterations of shape and dimensions by after-crystallization are practically excluded.

Still further, it has been proposed to incorporate into fiber-forming polyesters polyols having more than two hydroxyl groups. By this step the period of time required to obtain high molecular weights is shortened whereby the mechanical properties of the fibers are improved. For the manufacture of films and coatings polyesters are being used which are produced from terephthalic acid, ethylene glycol and at least trihydric alcohol. Films made from polyesters of this type are still flexible and not crystalline after heating for 1 hour at 220° C.

Moulded articles made from polyester moulding compositions are predominantly used for industrial purposes, for example for the manufacture of gear wheels, pivot bearings and disk cams. They have to meet high standards with regard to their mechanical properties and, moreover, they should have an especially good surface quality, fill the mould completely, have a high dimensional stability and be free from flash formation. Although the conditions of injection moulding can be varied within wide limits, it is very difficult to avoid flash formation with injection moulded polyethylene terephthalate. The method usually employed in injection moulding, i.e. to regulate the pressure during dwell time in such a manner that the mould is completely filled and the moulded articles remain free from flash formation, is often unsatisfactory. With a complete mould charge it is, therefore, necessary in most cases to subject the moulded article to a mechanical after-treatment after removal from the mould.

It has now been found that polyester moulding compositions comprising (a) aromatic dicarboxylic acids and optionally small amounts of aliphatic dicarboxylic acids,
(b) saturated aliphatic or cycloaliphatic diols, and
(c) alcohols having more than two primary hydroxyl groups in an amount of from 0.01 to 2% by weight, preferably 0.03 to 0.5% by weight, calculated on the weight of the polyester, do not show flash formation when injection moulded articles are made therefrom.

The moulding compositions according to the invention contain polyesters modified with small amounts of polyols which cause the formation of chain branchings.

As dicarboxylic acid in the polyester moulding compositions of the invention terephthalic acid is suitable in the first place. In addition to terephthalic acid units the polyester may contain up to 5 mole percent of other aromatic or aliphatic dicarboxylic acids as structural units, for example units of isophthalic acid, diphenyl-4,4'-dicarboxylic acid, naphthalene-2,6-dicarboxylic acid or adipic acid.

As diol component ethylene glycol is especially suitable. It is likewise possible, however, to use 1,4-bis-hydroxymethylcyclohexane. Besides ethylene glycol or 1,4-bis-hydroxymethylcyclohexane the diol component of the polyester may contain up to 10 mole percent of other aliphatic diols, for example 2,2-dimethyl-propanediol-(1,3) or butanediol-(1,4).

Suitable alcohols having more than two primary hydroxyl groups, which are designated as polyols, are, for example: 1,1,1-tris-hydroxymethyl-ethane, 1,1,1,1-tris-hydroxymethyl-propane, pentaerythritol, dipentaerythritol, 1,1,1,6,6,6-hexakis-hydroxymethyl-hexane 1,1,3,3-tetrakis-hydroxymethyl-cyclopentane and 1,2,4-tris-hydroxymethylbenzene. The polyols are used either individually or in admixture with one another.

The polyesters are prepared in known manner, for example by reacting diesters of the dicarboxylic acids and lower aliphatic alcohols with the diol and the polyol. The polyol can be added at different stages of the manufacturing process of the polyester. It may be reacted with the diester of the dicarboxylic acid together with the diol. Alternatively, it may be added to the reaction mixture after termination of the ester interchange reaction, whereupon the polyester is prepared by polycondensation in known manner.

Ester interchange reaction and polycondensation are accelerated in known manner by adding small amounts of catalysts.

The thermoplastic moulding compositions according to the invention contain polyesters having a reduced specific viscosity in the range of from 0.6 to 2.4 dl/g., preferably 1.0 to 1.7 dl/g., measured with a 1% solution in a mixture of phenol and tetrachloroethane 60:40 at 25° C. To produce polyesters having a high reduced specific viscosity, the polyesters obtained by polycondensation in the melt are subjected to a post-condensation in the solid phase in known manner:

The polyol-modified polyesters may also be components of thermoplastic moulding compositions containing, besides the polyester, up to 20% by weight, preferably up to 10% by weight, of polymers, for example copolymers of ethylene and acrylic acid esters or of butadiene and styrene, which improve the impact strength of the moulding compositions.

It is suitable to add to the polyester a crystallization promoting agent, for example an inorganic nucleating agent such as kaolin, talc, or an alkaline earth metal carbonate. The inorganic nucleating agents should preferably have a particle size below 2 microns. It is likewise possible to add to the polyesters organic crystallization promoting agents, for example ionic copolymers of ethylene and acrylic acid, containing sodium ions as cations. The crystallization promoting substances can be incorporated into the polyester composition in various ways. The nucleating agent and the polyester can be mixed, for example, by intense stirring in the molten state. It is advantageous to mix as uniform as possible the granulated or powdered polyester with the powder of the crystallization promoting agent, to melt the mixture in the extruder and to granulate it after cooling.

In order to obtain unobjectionable injection moulded articles the polyester moulding composition should contain as little moisture as possible, preferably at most 0.01% by weight. For this purpose the granulated polyester moulding composition may be coated with a layer of an inert hydrophobic substance, for example a wax or paraffin.

To produce shaped articles having a satisfactory degree of crystallization the temperature of the mould should be sufficiently above the second order transition temperature of the polyester. In the case of polyester moulding compositions on the basis of a modified polyethylene terephthalate mould temperatures in the range of from 120 to 150° C. are preferred.

The following examples serve to illustrate the invention but they are not intended to limit it thereto.

EXAMPLE 1

(a) A mixture of 35 kilograms of terephthalic acid dimethyl ester, 27 kilograms of ethylene glycol and 8.8 grams of manganese acetate (tetrahydrate) was heated to 175° C. whilst stirring. During the course of 4 hours the temperature was raised to 230° C. and the mixture was stirred until no more methanol distilled over. 52.5 grams of 1,1,1-tris-hydroxymethyl-propane were then added. The melt was stirred for 15 minutes. Next 2.34 grams of phosphorous acid were added to the melt and, after stirring for 15 minutes, 12.7 grams of germanium phosphite were added. During the course of 150 minutes the temperature was raised to 275° C. and the pressure reduced to 0.2 mm. of mercury. The melt was stirred for 4 hours under these conditions of temperature and pressure. A colorless polyester having a reduced specific viscosity of 0.88 dl/g. (measured with a 1% solution in a 60:40 mixture of phenol and tetrachloroethane at 25° C.) was obtained.

The granulated polyester was dried for 5 hours at 180° C. under reduced pressure in an eccentric tumbling drier, subjected to rotation at room temperature together with 0.4% by weight of powdery aluminum silicate (47% $SiO_2$, 38% $Al_2O_3$; 75% having a particle size of less than 2 microns), the mixture was homogenized in an extruder, granulated and then dried for 2 hours at 100° C. under a pressure of 0.4 mm. of mercury in an eccentric tumbling drier. The granules were then subjected to an after-condensation in the solid phase for 6 hours at 240° C. under 0.4 mm. of mercury. The aftercondensed polyester had a reduced specific viscosity of 1.52 dl/g. The granules were coated with 0.2% by weight of polyethylene wax.

Sheets of dimensions 60 x 60 x 2 mm. were injection moulded with the polyester composition at a temperature of the mould of 150° C. The sheets were injection moulded under different pressures, the pressure during dwell time being varied from 70 to 140° C. In each case the dwell time was 15 seconds. It was found that up to a pressure of 130 atmospheres gauge no flashes were formed.

(b) In a comparative experiment a polyester was prepared as described above with the exception that no 1,1,1-tris-hydroxymethyl-propane was added prior to polycondensation. When the composition was injection moulded noticeable flash formation was already observed under a pressure during dwell time of 70 atmospheres gauge, which flash formation considerably increased with increasing pressure and was very pronounced under a pressure above 100 atmospheres gauge.

EXAMPLE 2

A modified polyethylene terephthalate was prepared as described in Example 1 containing 0.10% by weight of 1,1,1-tris-hydroxymethyl-propane. The polyester was further treated as described above. The results are summarized in the following table. From the moulding composition sheets were obtained which exhibited a slight flash formation under a pressure during dwell time of 130 atmospheres only.

EXAMPLES 3–4

Two modified polyethylene terephthalates were prepared as described in Example 1 which were modified with (3) 0.15% by weight and (4) 0.10% by weight of pentaerythritol. The polyesters were further treated as described in Example 1. The results with respect to the charge of the mould and flash formation when the compositions were injection moulded are summarized in the following table.

TABLE

| Example No. | Polyethylene terephthalate (1) modified with— | Specific viscosity Before injection moulding | Specific viscosity After injection moulding | Pressure | Mould charge (2) | Flash (3) |
|---|---|---|---|---|---|---|
| 1(a) | 0.15% by weight 1,1,1-tris-hydroxymethyl-propane. | 1.52 | 1.43 | 70 | MC− | — |
|  |  |  |  | 90 | MC+ | — |
|  |  |  |  | 110 | MC+ | — |
|  |  |  |  | 130 | MC+ | — |
|  |  |  |  | 140 | MC+ | + |
| 1(b) | Nonmodified | 1.41 | 1.35 | 70 | MC+ | + |
|  |  |  |  | 90 | MC+ | + |
|  |  |  |  | 110 | MC+ | ++ |
|  |  |  |  | 130 | MC+ | ++ |
|  |  |  |  | 140 | MC+ | ++ |
| 2 | 0.10% by weight 1,1,1-tris-hydroxy-propane. | 1.42 | 1.34 | 70 | MC+ | — |
|  |  |  |  | 90 | MC+ | — |
|  |  |  |  | 110 | MC+ | — |
|  |  |  |  | 130 | MC+ | + |
|  |  |  |  | 140 | MC+ | + |
| 3 | 0.15% by weight pentaerythritol | 1.50 | 1.42 | 70 | MC+ | — |
|  |  |  |  | 90 | MC+ | — |
|  |  |  |  | 110 | MC+ | — |
|  |  |  |  | 130 | MC+ | + |
|  |  |  |  | 140 | MC+ | + |
| 4 | 0.1% by weight pentaerythritol | 1.48 | 1.40 | 70 | MC+ | — |
|  |  |  |  | 90 | MC+ | — |
|  |  |  |  | 110 | MC+ | + |
|  |  |  |  | 130 | MC+ | + |
|  |  |  |  | 140 | MC+ | + |

Referring to the table:

(1)

The polyester contained as nucleating agent 0.4% by weight of aluminum silicate powder (47% $SiO_2$, 38% $Al_2O_3$, 75% with particle size below 2 microns). The polyester granules were coated with 0.2% by weight of a polyethylene wax.

(2)

| | |
|---|---|
| Unobjectionable mould charge | MC+ |
| Objectionable mould charge | MC− |
| Flash higher than 4 mm | +++ |
| Flash from 1 to 2 mm | + |
| No flash | − |

What is claimed is:

1. A polyester for injection molding prepared by polycondensation of (a) terephthalic acid, (b) ethylene glycol or 1,4-bis-hydroxymethylcyclohexane, and (c) an alcohol having more than two primary hydroxyl groups in an amount in the range of from 0.01 to 2% by weight, calculated on the weight of the polyester, said polyester having a reduced specific viscosity in the range of from 0.6 to 2.4 dl/g. measured with a 1% solution in a 60:40 mixture of phenol and tetrachloroethane at 25° C.

2. The polyester defined in claim 1, wherein the polyester contains, in addition to terephthalic acid units, up to 5% by weight of units of a member selected from the group consisting of isophthalic acid, diphenyl-4,4′-dicarboxylic acid, naphthalene-2,6-dicarboxylic acid and adipic acid.

3. The polyester defined in claim 1, wherein component (b) of the polyester composition contains, in addition to ethylene glycol or 1,4-bis-hydroxymethyl-cyclohexane units, up to 10 mol percent of units of a member selected from the group consisting of 2,2-dimethyl-propanediol-(1,3) and butanediol-(1,4).

4. The polyester defined in claim 1, blended with up to 20% by weight of a copolymer of ethylene and acrylic acid ester or of butadiene and styrene.

5. A shaped article prepared from the composition defined in claim 1.

6. The polyester of claim 1, wherein component (b) of the polyester composition is ethylene glycol.

7. The polyester of claim 1, wherein component (b) of the polyester composition is 1,4-bis-hydroxymethyl-cyclohexane.

8. The polyester of claim 1, wherein component (c) of the polyester composition is at least one alcohol selected from the group consisting of 1,1,1-tris-hydroxymethyl - ethane, 1,1,1-trihydroxymethyl - propane, pentaerythritol, dipentaerythritol, 1,1,1,6,6,6 - hexakis-hydroxymethylhexane, 1,1,3,3-tetrakis - hydroxymethyl - cyclopentane and 1,2,4-trihydroxymethyl-benzene.

9. The polyester of claim 1, wherein the polyester composition has a reduced specific viscosity of from 1.0 to 1.7 dl/g., measured with a 1% solution in a 60:40 mixture of phenol and tetrachloroethane at 25° C.

References Cited

UNITED STATES PATENTS

| | | | |
|---|---|---|---|
| 2,768,213 | 10/1956 | Whetstone | 260—75 |
| 2,936,296 | 5/1960 | Precopio et al. | 260—873 |
| 3,360,500 | 12/1967 | Hergenrother | 260—75 |
| 3,402,147 | 9/1968 | Starck et al. | 260—873 |
| 3,446,758 | 5/1969 | Wiener | 260—75 |
| 3,489,707 | 1/1970 | Fry | 260—873 |

FOREIGN PATENTS

| | | | |
|---|---|---|---|
| 6511744 | 2/1967 | Netherlands | 260—75 |

OTHER REFERENCES

Chem. Abst.; vol. 67: 118157t (Sorokin et al.), "Heat ... Polyesters ... Wire."

Carbide (and Carbon) Chemicals, vol. 33, No. 22, May 30, 1955, p. 2315 (Chemical and Eng. News).

WILLIAM H. SHORT, Primary Examiner

E. WOODBERRY, Assistant Examiner

U.S. Cl. X.R.

260—75